(No Model.) 7 Sheets—Sheet 1.

J. FRASER.
GAS ENGINE.

No. 599,496. Patented Feb. 22, 1898.

Witnesses
H. van Oldenneel
E. A. Scott

Inventor
James Fraser
by Alexander R.
Attorneys (No Model.) 7 Sheets—Sheet 2.
J. FRASER.
GAS ENGINE.
No. 599,496. Patented Feb. 22, 1898.
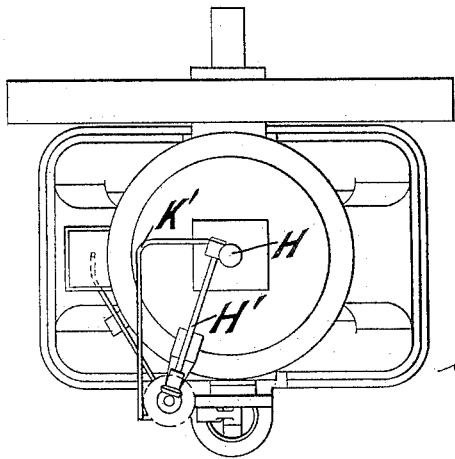
FIG. 3
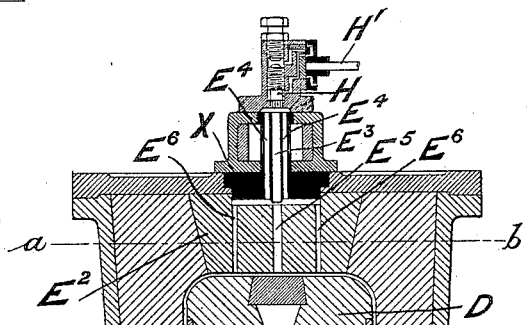
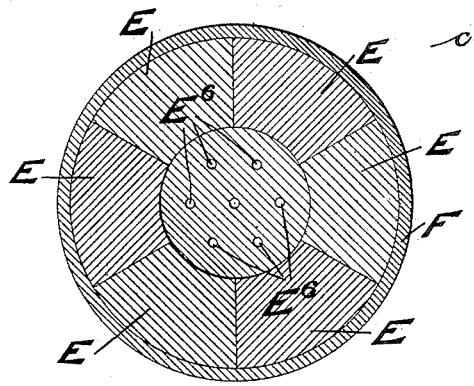
FIG. 5
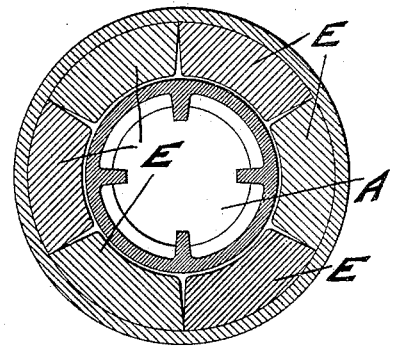
FIG. 6
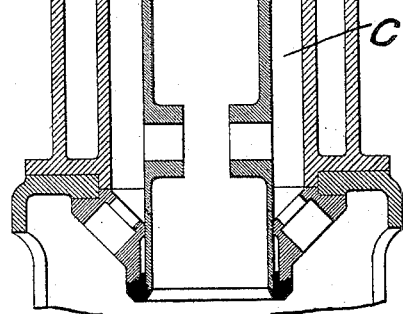
FIG. 4
Witnesses
H. van Oldenneel
E. A. Scott
Inventor
James Fraser
by [signature]
Attorneys (No Model.) 7 Sheets—Sheet 3.
J. FRASER.
GAS ENGINE.
No. 599,496. Patented Feb. 22, 1898.
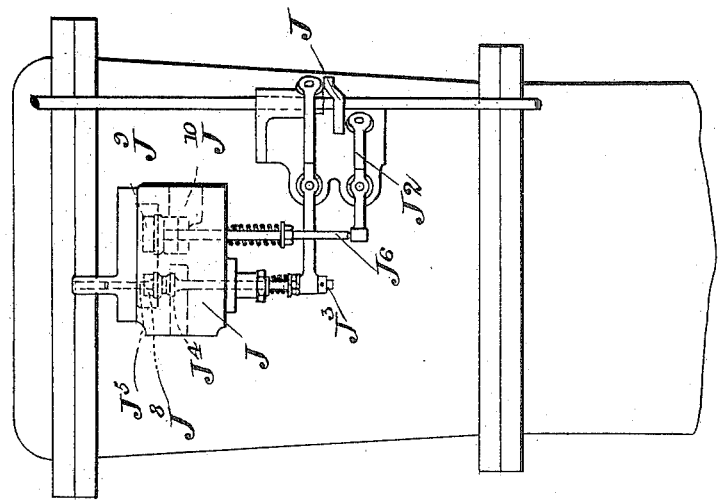
Fig. 3.B.
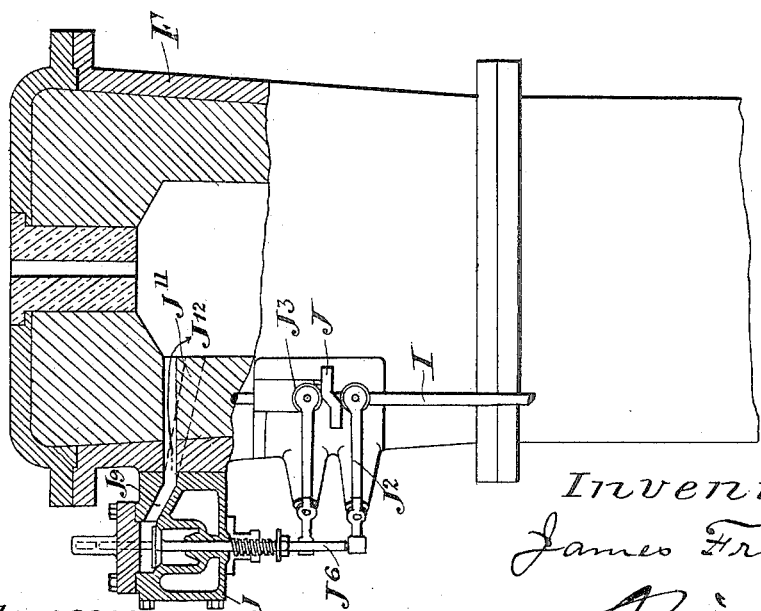
Fig. 3.A.
Witnesses: 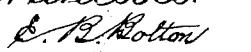
Inventor:
James Fraser
By 
his Attorneys.

(No Model.) 7 Sheets—Sheet 4.
J. FRASER.
GAS ENGINE.
No. 599,496. Patented Feb. 22, 1898.
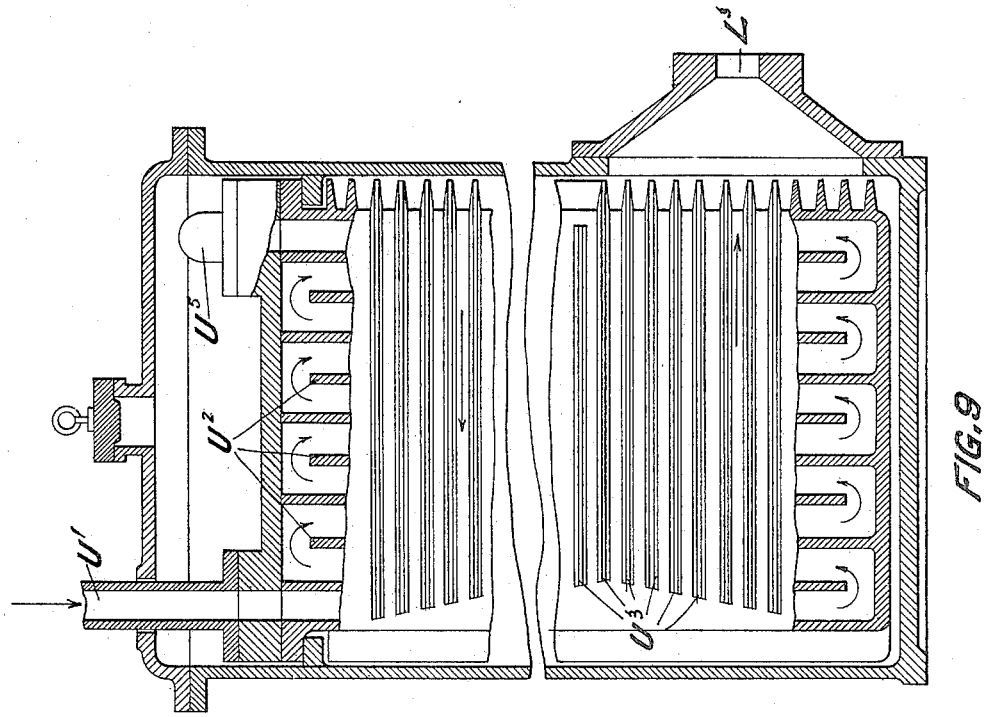
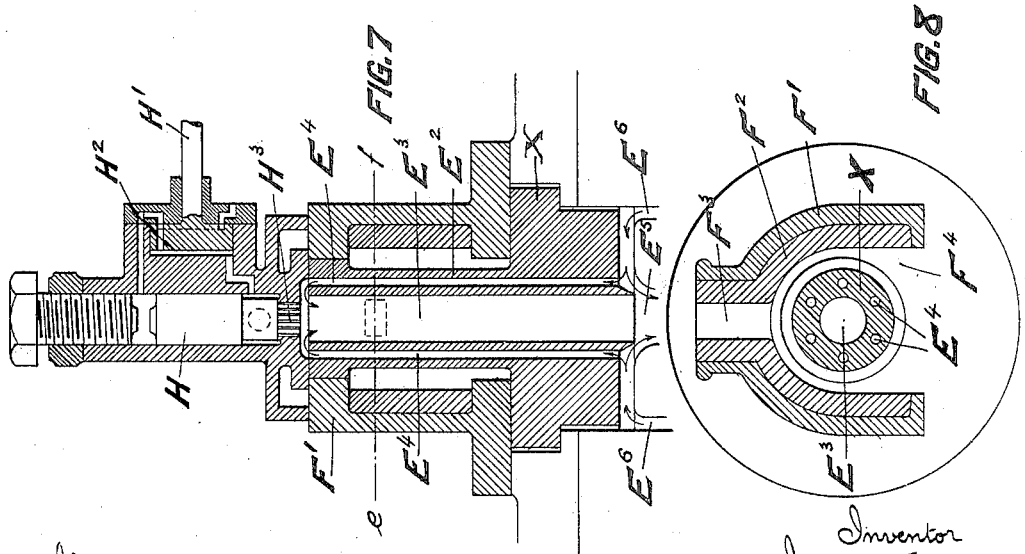
Witnesses
H. van Dedennieel
E. A. Scott
Inventor
James Fraser
by
Attorneys
THE NORRIS PETERS CO., PHOTO-LITHO., WASHINGTON, D. C.

(No Model.)

7 Sheets—Sheet 5.

J. FRASER.
GAS ENGINE.

No. 599,496.

Patented Feb. 22, 1898.

Witnesses:
J. B. Bolton
O. H. Umek

Inventor:
James Fraser
By
his Attorneys.

(No Model.) 7 Sheets—Sheet 6.
J. FRASER.
GAS ENGINE.
No. 599,496. Patented Feb. 22, 1898.
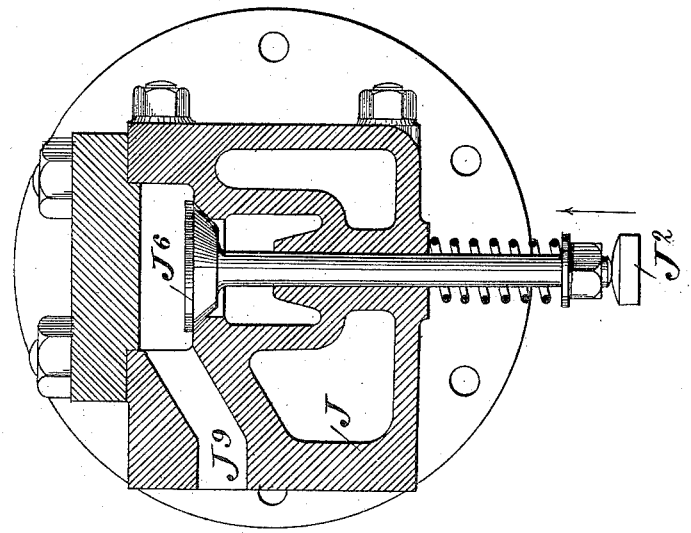
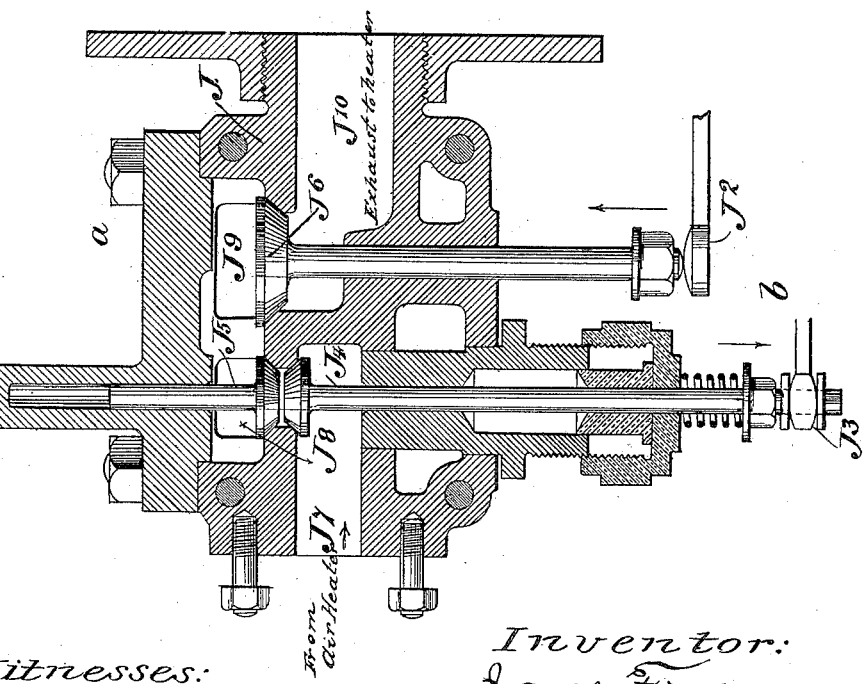
Witnesses:
E. B. Botton
O. B. Munk
Inventor:
James Fraser
By 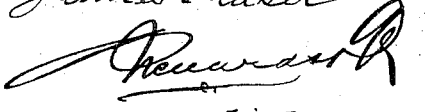
his Attorneys.

(No Model.) 7 Sheets—Sheet 7.

J. FRASER.
GAS ENGINE.

No. 599,496. Patented Feb. 22, 1898.

Witnesses
H. van Oldenneel
E. A. Scott

Inventor
James Fraser
by [signature]
Attorneys

UNITED STATES PATENT OFFICE.

JAMES FRASER, OF LONDON, ENGLAND.

GAS-ENGINE.

SPECIFICATION forming part of Letters Patent No. 599,496, dated February 22, 1898.

Application filed June 15, 1896. Serial No. 595,628. (No model.)

*To all whom it may concern:*

Be it known that I, JAMES FRASER, engineer, a citizen of Great Britain, residing at 9 Malvern Terrace, Barnsbury, London, N., England, have invented certain new and useful Improvements in Gas-Engines, of which the following is a specification.

My invention relates to gas-engines in which the air supply and gas supply are separately compressed into chambers, the compressed air being admitted to the power-cylinder for a portion of the forward stroke, the air-supply then cut off, and the compressed gas admitted and caused to be mixed with the air in the cylinder by the means hereinafter described, then ignited, and the power stroke produced.

My invention consists in a special arrangement of passages for mixing the gases as they enter the cylinder and in valve mechanism for controlling the supply of explosive mixture to the engine.

Figure 1:
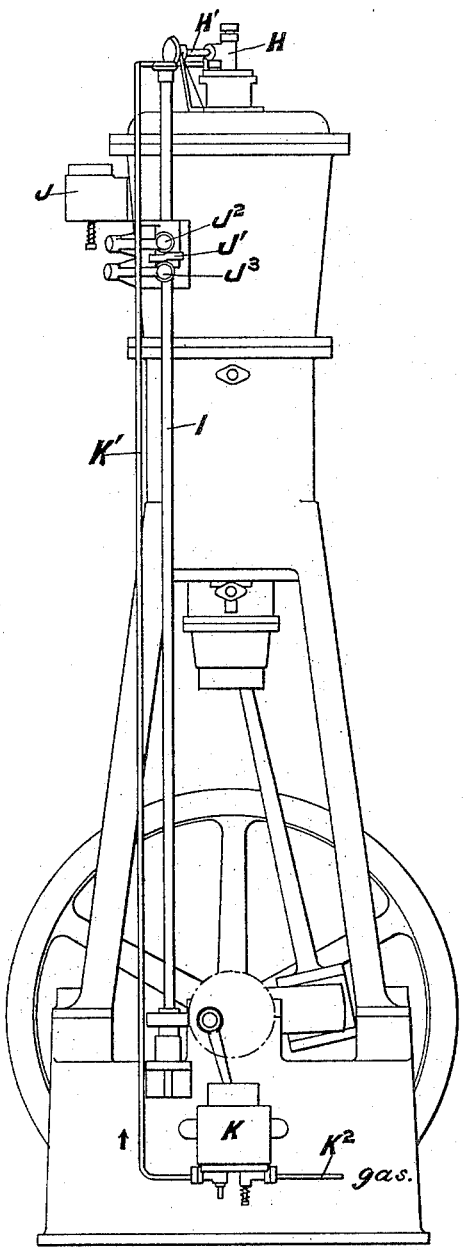
Figure 2:
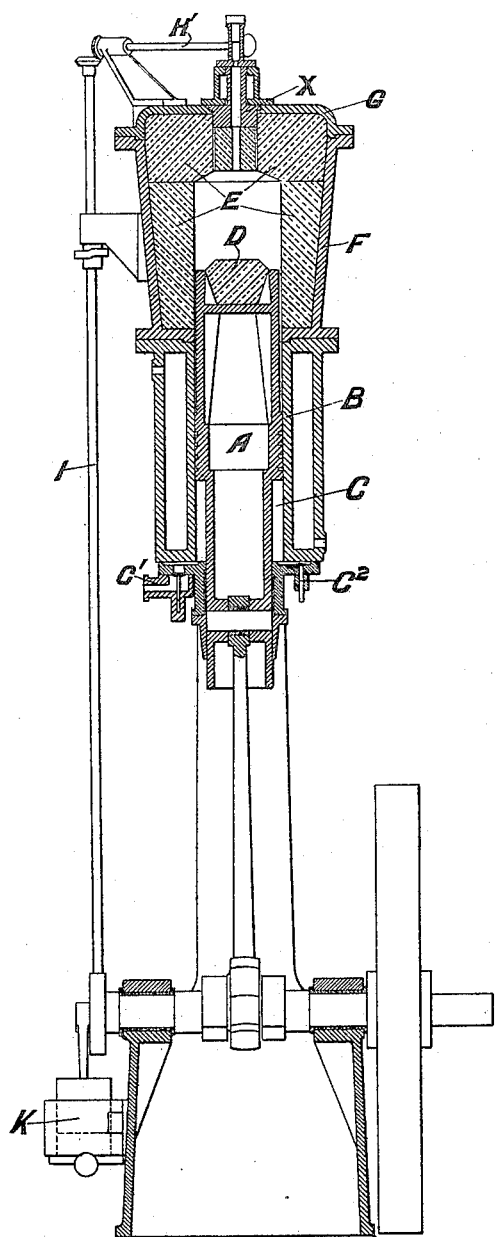
Figure 7A:
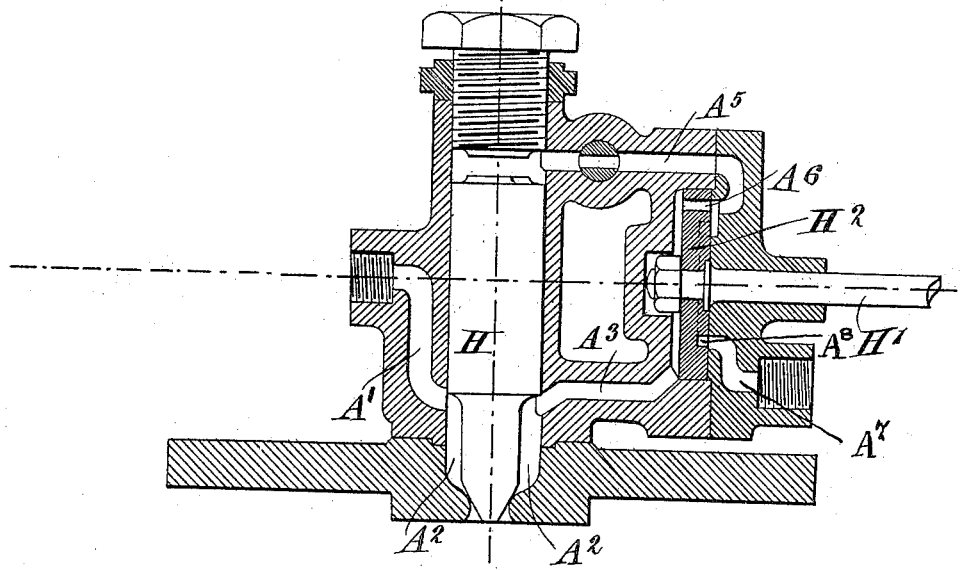
Figure 7B:
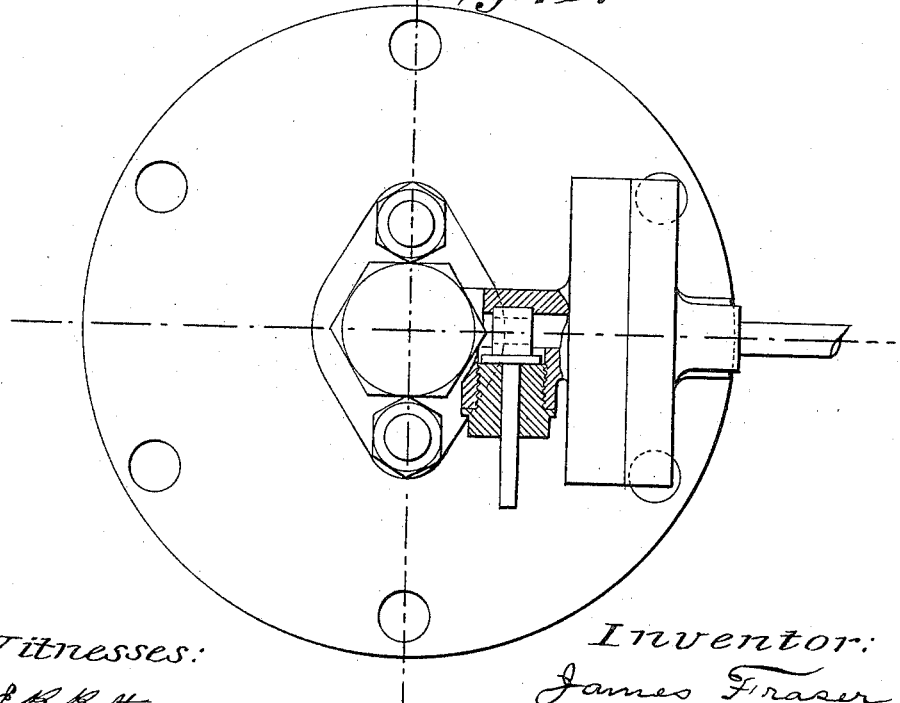
Figure 10:
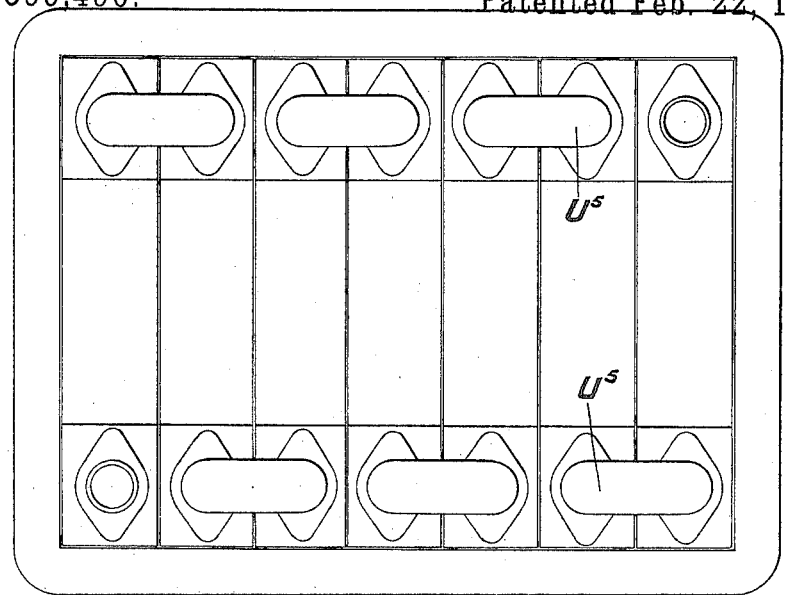
Figure 11:
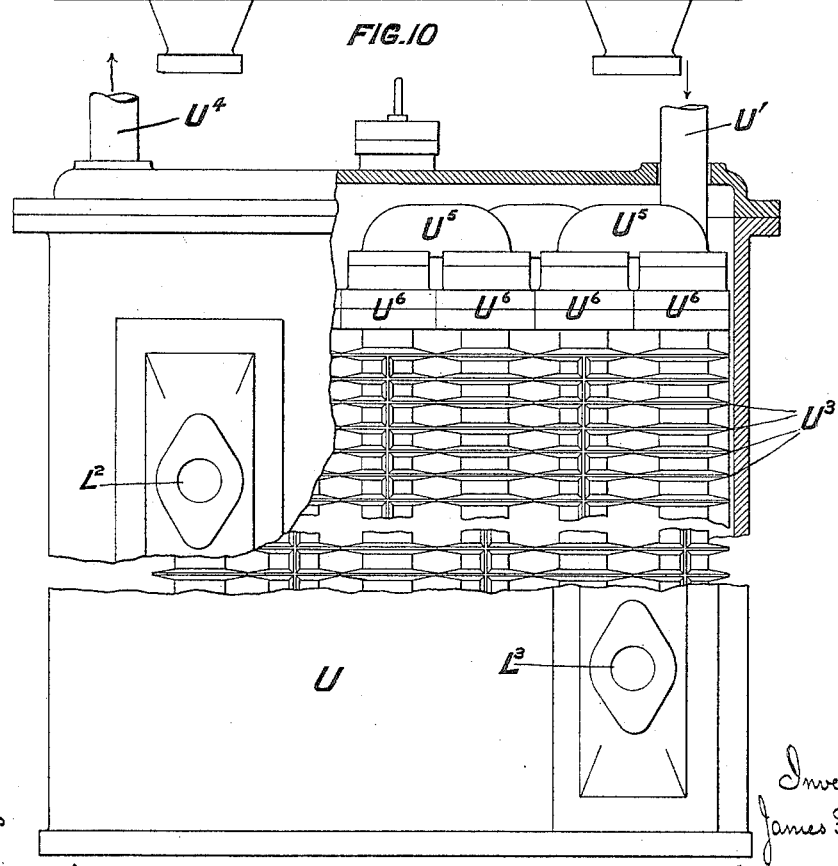

Referring to the seven accompanying sheets of drawings, which illustrate an application of my invention to an engine and gas-producer, Figure 1 is a side elevation of a gas-engine. Fig. 2 is a transverse vertical section, and Fig. 3 is a plan. Figs. $3^A$ and $3^B$ are respectively sectional elevation and elevation only of a part of the cylinder to show the gear operating the air and exhaust valves. Fig. 4 is a vertical section through the engine-cylinder on a larger scale. Fig. 5 is a section on the line $a\,b$ of Fig. 4. Fig. 6 is a section on the line $c\,d$ of Fig. 4. Fig. 7 is a vertical section, on a still larger scale, of the gas-admitting arrangements to the cylinder; and Figs. $7^A$ and $7^B$ are further detail views, on a large scale, of the admitting and regulating gas-valves and they are respectively sectional elevations and sectional plans. Fig. 8 is a section on the line $e\,f$ of Fig. 7. Fig. $8^A$ is a vertical section through the exhaust and air valve-box, and Fig. $8^B$ is another vertical section through the same box on the lines $a\,b$, Fig. $8^A$. Fig. 9 is a transverse section showing part of the interior in elevation of one form of an air-heater. Fig. 10 is a plan, and Fig. 11 is a side elevation, of the air-heater, part in section.

The same or similar letters are used throughout the drawings to indicate the same or like parts.

A trunk-piston A operates in a water-jacketed cylinder B, and the annulus C, formed between the trunk and the cylinder, serves as the air-compressing pump, the trunk being packed by any convenient packing, preferably metallic rings. The air-compressing pump is supplied with inlet-valve $C^2$ and discharge-valve $C'$, as shown clearly in Fig. 2, at the bottom of the annulus C, the valve $C^2$ opening inward from the atmosphere, while the valve $C'$ opens outward into a suitable pipe communicating with the air-heater hereinafter described. The working part of the piston is made tight by rings in any usual manner, and it carries a reduced extension or plunger, which enters into the non-conducting lining E, forming the combustion-space, but does not come in sliding contact with it. The end of the plunger is protected by a non-conducting block D. The non-conducting lining E is closed within an iron casing F and cover G. The non-conducting lining E consists, preferably, of porcelain or some other suitably non-porous non-conducting material, and it is divided radially into separate blocks or segments, as shown at Figs. 5 and 6, to avoid fracture from unequal expansion.

The actual admission of gas to the combustion-chamber is by a small piston-valve H, which in turn is governed by a disk valve $H^2$, all operated in a manner to be hereinafter described.

Figs. $8^A$ and $8^B$ illustrate in detail the valve-box J for regulating air admission to and exhaust-discharge from the motor end of the cylinder, and the operation is as follows: The port $J^7$ communicates always by a pipe with the air-heater, and at the proper moment a lever $J^3$, actuated in a manner hereinafter described, pulls down the valve $J^4$ in the direction of the arrow and allows the hot compressed air to blow open the lift-valve $J^5$, and flowing into the chamber above passes down through the port $J^8$ into the cylinder. At the proper moment the exhaust-valve $J^6$ is lifted up and opened by the lever $J^2$, actuated in a manner hereinafter described, allowing the gases to flow up the port $J^9$, past the valve, into the port $J^{10}$, where they are led by a pipe to the air-heater. The ports in the cylinder with which these two ports $J^8$ and $J^9$ communicate are shown clearly on Figs. $3^A$ and $3^B$ and are lettered, respectively, $J^{11}$ and $J^{12}$.

K is the gas-pump, which takes in gas and compresses it into the cylinder by way of the pipe $K'$.

When the engine is to be started, the porcelain block X, which contains passages connecting between the gas-supply valve and the cylinder, is heated up by an external forced flame of any well-known type, such as is used for heating up the igniting-tubes and combustion-chambers of petroleum-engines. This block X is surrounded with a casing $F'$, lined with non-conducting material, and the flame is applied by way of the open side $F^4$ and the passage $F^3$. When this block is raised to incandescence, gas is injected into air introduced into the cylinder as hereinbefore described. The gas passes by way of the holes $H^3$ from the valve, discharges through the central aperture $E^3$, mixing with air induced to pass from the cylinder by its flow, the air passing, as indicated by the arrows, Fig. 7, up the holes $E^6$ and the holes $E^4$. The gas thus mixes with sufficient air to make it combustible and ignites as it passes the incandescent part of the block X. The engine then starts, operated by a series of low-pressure explosions. The air-and-gas pressure is then slowly raised until the engine is operating at its full power.

When the engine is in full action, the whole of the non-conducting surfaces of E are raised to incandescence, and the action is as follows: The front side of the piston A, acting as an air-pump, takes in a charge of air from the atmosphere at the valve $C^2$. On the return stroke this air charge is compressed and is discharged from the pump by the valve $C'$. It then passes to an air-heater, to be subsequently described. The air-heater stores up the air under compression and heats it to a point considerably above the temperature of compression. When the piston A is at the upper end of its stroke, the air-supply is admitted to the cylinder by way of the valve-box J, valves $J^4$ $J^5$, and ports $J^8$ $J^{11}$ into the cylinder upon these said valves being opened by the lever $J^2$, which in turn is moved by one side of the cam $J'$. The air is thus admitted under pressure and, after heating, to the cylinder of the engine, and the piston moves on its stroke, taking in air at the full pressure of compression. At a certain point, depending upon the amount of compression used, the air-supply to the cylinder is cut off and the gas-valve H is immediately opened. The gas-pump K has taken charge of gas from the producer and compressed it into the pipe $K'$ and, if need be, a convenient reservoir, and the pressure of gas has been raised to a considerable point above the pressure of compression of the air. The gas is preferably heated after compression in the same manner as the compressed air. When the gas-valve H is opened, the gas therefore rushes through the holes $H^3$, passes through the central channel $E^3$, and induces an air-current by way of the holes $E^6$ $E^4$, so that gas and air mix in the channel $E^3$ and enter the cylinder by the channel $E^5$. The mixture as it passes the incandescent channels $E^3$ $E^5$ and impinges upon the surfaces of the incandescent non-conducting material D E ignites and an explosion or combustion is produced which applies a motive impulse to the piston A. The air in its projection through the channels $E^3$ and $E^5$ moves at such velocity that ample air is drawn from the cylinder to mix with the gas. The air and gas supply are thus thoroughly mixed in the cylinder itself and not outside of it. The piston A proceeds on its downward or power stroke, and at or near the termination of the stroke the exhaust-valve is opened by the lever $J^2$, operated on by the other side of the cam $J'$, as shown clearly on Figs. $3^A$ and $3^B$. The exhaust-gases are still at a very high temperature because of the absence of cooling-walls surrounding the combustion-spaces, and the exhaust-gases are then discharged from the engine on the upstroke to operate in the regenerator of the gas-producer in a manner to be described later on. On the upstroke the lower side of the piston is taking another charge of air from the atmosphere, and on the upper side the exhaust-valve is closed at a suitable point, so that when the piston reaches the end of its stroke the exhaust-gases remaining in the cylinder are compressed, preferably, to an extent about equal to the pressure of air compression. The air-inlet valve is then opened, the heated-air charge under compression enters the cylinder, is cut off at a certain point of the stroke, and gas is admitted to be burned or exploded, as hereinbefore described. This in the main describes the operation of the engine itself.

The gas-valve is a combination of piston-valve and rotating disk valve, as shown at Fig. 7 and on a larger scale in detail on Figs. $7^A$ and $7^B$. The disk valve is lettered $H^2$, and it is driven from the valve-shaft I by the cross-shaft $H'$, gearing to the valve-shaft I by bevel-wheels, clearly shown in Fig. 1. The valve-shaft I is shown as driven by skew-wheels; but it may be driven from the crank-shaft by any other convenient gearing.

The cross-shaft $H'$ operates the disk valve $H^2$, which valve controls the piston-valve H by means of ports opening above and below the piston-valve. When the valve $H^2$ occupies the position shown in Figs. 7 and $7^A$, gas-pressure from the supply-pump K is always present in the port $A'$ and channel $A^2$ around the stem of the valve H, and the ports $A^3$ $A^5$ in the valve-casing and $A^6$ in the disk valve admit that pressure onto the top of the valve H, so that as there is less pressure in the combustion-chamber the valve H is held down to its seat by the effect of that difference and also, if it is off its seat, carried down and closed by the rush of gas in that direction owing to the difference of pressures. When the valve H² is rotated to another position, the upper side of the piston H is caused to communicate with the atmosphere or with a portion of gas at atmospheric pressure by the port A⁵ in the casing being connected to the exit-port $a^7$ by the channel-passage A⁸. The pressure of the gas is allowed to bear upon the under side of the said piston-valve. The valve then rises from its seat and discharges gas through the apertures H³ into the cylinder, as described.

By the hereinbefore-described arrangement of rotary disk valve and piston gas-valve a compact method of regulating the admission of gas to a gas-engine cylinder of this class by using the differences of pressure to open and shut the valve is produced especially suitable for gas-engines, as the actual regulating-valve can be brought as close to the porcelain igniter as may be required.

In the drawings I have shown some slight differences between the methods of fastening the non-conducting porcelain in Figs. 2, 4, 5, and 6; but these variations are slight. The principle operating is the same in both.

The construction of air-heater preferred by me is shown at Figs. 9, 10, and 11, and it consists of a series of chambers U⁶, connected together by alternately-disposed pipes U⁵, each chamber being divided by partitions U². The air to be heated after being compressed by the pump enters at the pipe U', passes through one division U⁶ by the dividing-plates, as indicated by the arrows, enters another division U⁶, passes along, as described, and so on from division to division until the air has passed over a very large surface. It then issues from the heater in a compressed and heated state to be fed to the engine-cylinder, as described. The exhaust-gases from the engine, which have, however, first passed through the gas-producer regenerator, enter the air-heater by the passage L² and are discharged from it by the passage L³. The exterior surfaces of the heating-chambers U⁶ are covered by gills or radiators U⁸, and these gills or radiators are so disposed that the exhaust-gases pass along a somewhat tortuous passage in order to cover the whole surface of the radiators or heat-absorbers. By this arrangement the air-heating divisions absorb heat from the exhaust-gases and communicate that heat by conduction to the interior surfaces, which heat the compressed air. The gas-pump takes its supply of gas from the producer by way of the pipe K², Fig. 1.

Having now described my invention, what I claim as new, and desire to secure by Letters Patent, is—

1. A gas-engine comprising a cylinder, a piston, a gas-supply, a gas-valve, a passage leading into the combustion-chamber for discharging the gas into the same, an air-supply passage leading from a source of air-supply to the combustion-chamber, and air-passages extending from the combustion-chamber of the cylinder independent of both the air-inlet and gas-inlet, and connecting with the said gas-inlet passage, substantially as described.

2. In combination, the cylinder, the piston and the air and gas supply, the said cylinder having the gas-inlet passage E³ and the air-passages E⁴ leading from the cylinder to connect therewith said air-passages being independent of the air-inlet passage leading to the cylinder, substantially as described.

3. In combination in a gas-engine, the cylinder, the piston and the air and gas supply, the inlet-passages E³, E⁵, for the gas and the passages E⁴ E⁶ for the air connecting with the combustion-chamber and with the gas-passages for drawing the air from the cylinder said air-passages being independent of the air-inlet passage leading to the cylinder, substantially as described.

4. In combination in a gas-engine, the cylinder, the piston, the gas-supply and the valve mechanism comprising the piston-valve H and the rotary valve H² controlling the opening of the valve H and thus the supply to the engine, substantially as described.

5. In combination, the cylinder, the piston and the air and gas supply, said cylinder having an incandescent igniting-block, gas-inlet passage E³ leading through the same, the air-passage E⁴ parallel with and connecting with the gas-passage, and the air-passage E⁶ and gas-passage E⁵, said passages meeting at the igniting-block, substantially as described.

In witness whereof I have hereunto set my hand in presence of two witnesses.

JAMES FRASER.

Witnesses:
FRANK WESELY DICK,
ALFRED TOPWORTH.